May 7, 1929.  L. E. HACKETT  1,711,676
FLUID METERING SYSTEM
Filed Sept. 29, 1926   2 Sheets-Sheet 2

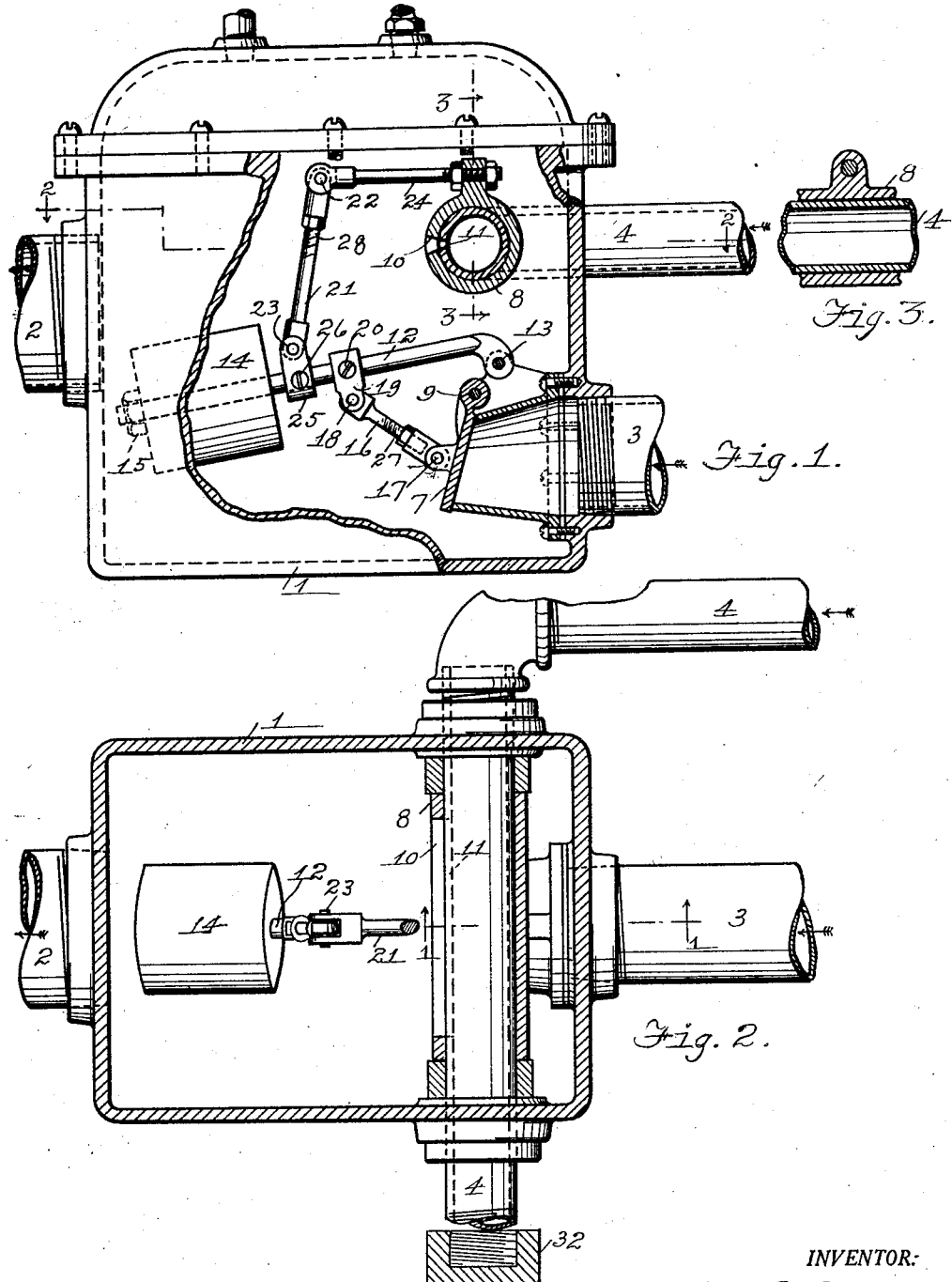

INVENTOR:
Lewis E. Hackett
BY Cyrus W. Rice
ATTORNEYS.

Witness:
Geo. L. Chapel

Patented May 7, 1929.

1,711,676

UNITED STATES PATENT OFFICE.

LEWIS E. HACKETT, OF LANSING, MICHIGAN.

FLUID-METERING SYSTEM.

Application filed September 29, 1926. Serial No. 138,372.

The present invention relates to fluid-metering systems; and its object is, generally, to provide improved devices whereby the fluid passing therethrough may be accurately metered; and more particularly, to provide in a metering system a fluid channel comprising branches having valves so interrelatively operated as to cause the fluid passing through the branches to be accurately measured by the metering apparatus therein; and further, to provide in such a system a fluid channel comprising branches, one of which contains a meter adapted to accurately measure the greater amounts of fluid passing through the system and having a valve openable by the fluid pressure in said branch, the other branch containing a meter adapted to accurately measure the lesser amounts of fluid passing through the system; and further, to provide in such a system a fluid channel comprising branches, one of which contains a meter adapted to accurately measure the greater amounts of fluid passing through the system and having a valve openable by the fluid pressure in said branch, the other branch containing a meter adapted to accurately measure the lesser amounts of fluid passing through the system, each of the branches having valves, the valve in the first-mentioned branch being openable by a degree of fluid pressure therein, there being connections between the valves for operating the same interrelatively.

These and any other and more specific or subsidiary objects hereinafter appearing are attained by, and the invention finds preferable embodiment in, the structure hereinafter particularly described in the body of this specification and illustrated by the accompanying drawings, in which:—

Figure 1 is a side view of a portion of a fluid-metering system, the side wall of a tank or fluid vessel thereof having its near wall broken away, and certain parts being vertically sectioned on line 1—1 of Figure 2;

Figure 2 is a horizontal sectional view of the same, taken on line 2—2 of Figure 1;

Figure 3 is a vertical sectional view of certain parts taken on line 3—3 of Figure 1;

Figure 4:
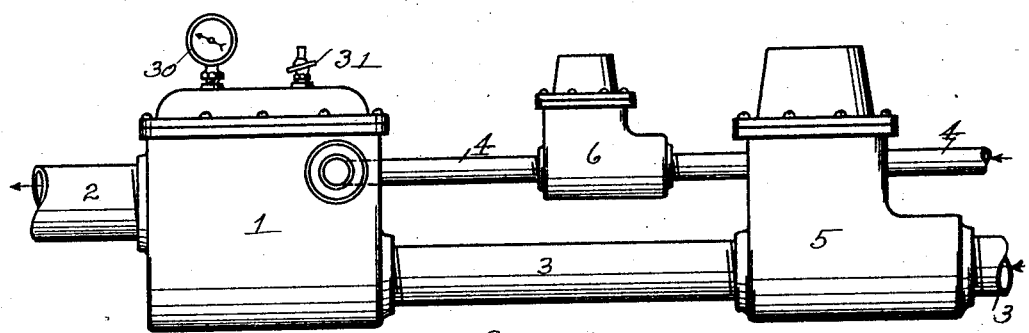
Figure 4 is a side view of the metering system.
Figure 5:
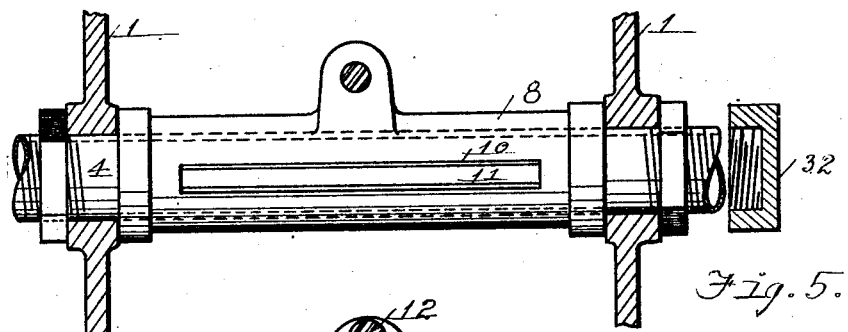
Figure 5 is a side view of a rotary valve therein.
Figure 6:
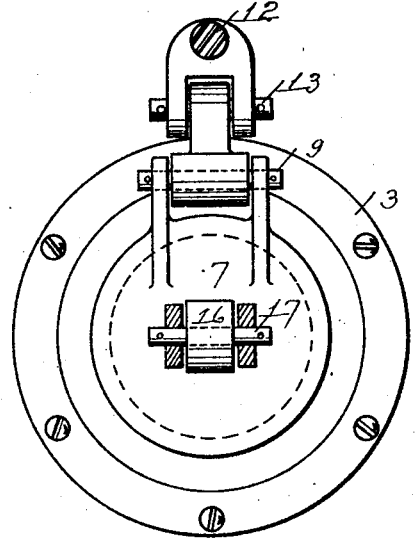
Figure 6 is a face view of another valve in the system.

In the accompanying drawings, a system or apparatus for metering fluids—such as water—is shown including a fluid channel comprising a tank or vessel 1 having a discharge pipe 2 and branches 3, 4 through which the fluid passes into the tank or vessel 1, these branches containing meters indicated at 5 and 6 for measuring the amounts of fluid passing through the branches respectively. The meter 5 in the primary branch 3 is adapted for metering the fluid passing through the channel and out of the discharge pipe 2 in ordinary service conditions, while the meter 6 in the secondary branch 4 is adapted for metering the fluid passing through the channel and discharge pipe 2 in amounts too small to be metered by such a meter as the meter 5 which is adapted to accurately measure fluid passing therethrough only in the greater amounts supplied to the user under ordinary service conditions. In other words, the meter 6 is capable of measuring fluid passing therethrough in such small amounts as would not operate the larger and ordinary service meter 5.

To attain the desired end of metering all the fluid passing through the channel and its discharge pipe 2, the branches 3, 4 are respectively provided with valves 7, 8, beyond the meters therein, i. e., at points where the branches vent the metered fluid into the tank 1.

The valve 7 in the primary branch 3 tends to assume its closed position seen in Figure 1, but is movable to open position by a certain degree of the fluid pressure in the system as the same may be controlled by a cock or the like (not shown) governing the fluid supply. This valve 7 is shown as a door valve swingable to open and closed positions on a hinge 9, while the valve 8 controlling the venting of fluid from the secondary branch 4 is shown as a rotary valve comprising a sleeve turnable about the secondary branch pipe 4 in the tank and having a venting slit 10 movable into and out of registration with a slit 11 through the wall of the secondary pipe 4, said slits being shown in registration in Figure 1, the valve being thus in open position as shown in said view.

In order that the valves may be operated interrelatively, or alternately opened or closed, by the fluid pressure in the system's branches 3, 4, connections are provided between the two valves so that one may be closed while the other is opened and vice versa, such connections being adjustable to thus operate the valves at different degrees of such fluid pressure as may be desired, and to move the valves to interrelatively different open or closed positions. Such connections for these purposes may be of various forms, and I desire to claim such connections broadly. In the embodiment of the invention illustrated, such connections or valve-operating means comprise an arm 12 mounted at 13 to swing vertically and having a weight 14 movable therealong to adjusted positions in which it may be held by a nut 15 threaded on the arm. A link 16 is pivoted at its ends, at 17 and 18 respectively, to the valve 7 and to a collar 19 slidable to adjusted positions on the arm 12 and held therein by a set screw 20; and a link 21 is pivotally connected at its ends, at 22 and 23 respectively, to the crank arm 24 of the rotary valve 8, and to the collar 25 slidable to adjusted positions on the arm 12 and held therein by a set screw 26. Each of these links comprises two portions threaded together at 27 and 28 respectively, so that they may be lengthened or shortened as may be desired. It will be seen that by turning said two portions of one or the other or both of those links on their threads, and by adjusting one or the other or both of the collars 19, 25 to desired positions on the arm 12, the interrelative operation of the valves and the degree of fluid pressure in the system for thus operating them may be very nicely adjusted, the amount of fluid pressure necessary to thus operate the valves being also adjustable by moving the weight 14.

It will be seen that, in ordinary service conditions wherein considerable amounts of fluid pass through the system thus creating a pressure on the valve 7 of the primary branch 3 sufficient to open the same, the fluid is metered by the meter 5 in said branch; but when only slight amounts of fluid pass through the system, insufficient to create pressure enough to open the primary branch's valve 7, such slight amounts pass through and are measured by the meter 6 in the secondary branch 4 and vent through the valve 8 which is opened by the closing of the valve 7. If the valve 8 in the secondary branch 4 be removed or dispensed with, the fluid passing through said branch will be metered by the meter 6; and when the fluid pressure is sufficient, the valve 7 will be opened thereby so that the fluid passing through the primary branch 3 will be metered by the meter 5. A pressure gage is shown at 30, a cock for relieving pressure in the tank at 31, and a screw cap for closing the end of branch pipe 4 is shown at 32.

The invention being intended to be pointed out in the claims, is not to be limited to or by details of construction of the particular embodiment thereof illustrated by the drawings or hereinbefore described.

I claim:

1. In a fluid-metering system: a fluid channel comprising primary and secondary branches, each containing a fluid meter and having a valve beyond the meter, the primary branch's valve being openable by a degree of fluid pressure therein; connections between the valves for closing the secondary branch's valve by the opening movement of the primary branch's valve, said connections being adjustable to move the valve of the secondary branch to adjustably different positions relatively to the valve of the primary branch.

2. In a fluid-metering system: a fluid channel comprising primary and secondary branches, each contaiinng a fluid meter and having a valve beyond the meter, the primary branch's valve being openable by a degree of fluid pressure therein; a swingably mounted arm having a weight adapted to be moved therealong to adjusted positions; connections between the arm and the valves respectively for closing the secondary branch's valve by the opening movement of the primary branch's valve.

3. In a fluid-metering system: a fluid channel comprising primary and secondary branches, each containing a fluid meter and having a valve beyond the meter, the primary branch's valve being openable by a degree of fluid pressure therein; a swingably mounted weighted arm; connections between the arm and the valves respectively for closing the secondary branch's valve by the opening movement of the primary branch's valve, the connection between at least one of the valves and the arm being adapted to be moved therealong to adjusted position.

In testimony whereof I have hereunto set my hand at Lansing, Michigan, this 25th day of September, 1926.

LEWIS E. HACKETT.